United States Patent [19]

Avery et al.

[11] 3,744,031
[45] July 3, 1973

[54] METHOD AND APPARATUS FOR RECORDING AND VERIFYING MAGNETIC TAPE PROGRAMS FOR MACHINE TOOLS

[75] Inventors: Theodore P. Avery, Los Angeles; Ralph P. Hubbard, Lynwood, both of Calif.

[73] Assignee: North American Rockwell Corporation, El Segundo, Calif.

[22] Filed: May 19, 1971

[21] Appl. No.: 144,927

[52] U.S. Cl. ............................................. 340/172.5
[51] Int. Cl. ............................................ G05b 15/00
[58] Field of Search .................................. 340/172.5

[56] References Cited
UNITED STATES PATENTS

| | | | |
|---|---|---|---|
| 3,248,705 | 4/1966 | Dammann et al. | 340/172.5 |
| 3,307,154 | 2/1967 | Garth, Jr. et al. | 340/172.5 |
| 3,618,032 | 11/1971 | Goldsberry et al. | 340/172.5 |

*Primary Examiner*—Raulfe B. Zache
*Attorney*—L. Lee Humphries, Allan Rothenberg and Charles F. Dischler

[57] ABSTRACT

A tool-operating copy of a magnetic tape program for a machine tool is made from a master tape that has been produced by a large-scale computer. The master tape is scanned and a desired program therefrom is read into the memory of a small interfacing computer. The output of the interfacing computer is used to reproduce the selected program in a cartridge tape unit which provides the actual tool-operating copy. While the copy is being made, information temporarily stored in the interfacing computer is printed out for visual identification. Portions of the program determined to be in error by visual insepction, or portions desired to be changed, are fed back into the interfacing computer through a keyboard device to correct the appropriate parts of the program contained within the interfacing computer memory and also correct the cartridge operating copy.

12 Claims, 2 Drawing Figures

METHOD AND APPARATUS FOR RECORDING AND VERIFYING MAGNETIC TAPE PROGRAMS FOR MACHINE TOOLS

BACKGROUND OF THE INVENTION

1. Field of the Invention

The present invention relates to the field of numerically controlled machine tools, and more particularly concerns verification, correction and copying of magnetic tape programs employed to direct and to control operation of such machines.

2. Description of Prior Art

The so-called numerically controlled machine tools employ electronic director circuitry that provides signals to various drive motors which, in turn, operate a cutting tool and effect motion of the tool in various directions relative to a work table to which the workpiece is affixed. The electronic director circuitry receives and interprets command signals obtained from a program that is read at the machine, by the director or by a machine program reader, which program has been previously prepared, generally with the aid of a large general-purpose computer.

For each part that is to be made, or for each series or group of operations to be carried out by a particular machine tool, there is required a separately prepared program. Further even though the part to be made is the same, if it is to be made upon or by a different machine, a separate program is often required. The individual program is generally prepared by feeding information into a large general-purpose computer, such information including size, dimensions and configuration of the part to be made, characteristics of the individual machine tool upon which the part is to be made and sequences of operations that are to be carried out under control of the program. The computer then provides an output record, in digital form, of the desired machine tool control program based upon the input information provided.

Over a period of time, many different parts are made and many different machine tools may be employed by or at a single operating facility. Accordingly, there is accumulated a program library, or file storage, containing quantities of such programs. To make a particular part on a particular machine, the appropriate program must be selected from a master record contained in the program library, or file storage, and provision must be made to present the selected program to the program reader that forms a part of the actual machine.

Because of the visible indicia (holes) employed in punched tape, it has been the common practice to make punched tape copies of selected programs from the master records stored in the program library, and to employ such punched tape records as the tool-operating program that is actually read at the machine. The punched tape has the major advantage of visibility of its indicia, whereby the hole pattern of the tape may be studied to verify that the tape does indeed carry the program desired, and, further, that the program so carried is accurate. Moreover, punched tape can be readily corrected by adding new patterns of holes and blocking existing hole patterns as may be desired.

Particularly for use in the control and direction of numerically controlled machine tools, magnetic tape has many advantages including increased speed of operation, greater versatility and ease of handling, and greater density of information storage. However, magnetic tape cannot be readily inspected, even to identify the program actually contained thereon. Certainly, no verification of accuracy of the program may be made by visual inspection of the tape. Nevertheless, advantages of magnetic tape outweigh disadvantages, and many large-scale installations of numerical machine tools employ magnetic tape readers for actual tool direction.

Master tape reels upon which a large number of programs are stored and retained in a program library are not employed at the machine tool itself as the tool-operating director, since such actual field use will subject the master to unreasonable abuse, wear and tear, and possible damage. Further, the master tape reel often contains a large number of programs, so that it is impractical to employ the master tape when but a single program contained thereon is to be used. Therefore, in at least some installations employing magnetic tape readers for the actual machine tool director, it is common to employ the master reel and the large general purpose computer to make a duplicate reel of tape bearing solely the desired program or programs. The selected program or programs are then cut from the duplicate tape and, in some cases, physically loaded by hand into a tape cartridge mechanism that is to be employed in a tape cartridge reader provided for control at the machine tool.

Physical loading of the cartridge is a difficlt and time-consuming process and often results in wrinkles, creases and other damage to the tape. Further, sudden impact, such as dropping or striking the tape or its transport, can partially demagnetize recorded information. Stray electrical magnetic fields can demagnetize parts of the tape. Shop environment may often be such as to contaminate the magnetic surface of the operating tape copy, thereby introducing still further errors.

Because of these hazards and to insure an accurate part, the operating tape copy must be verified prior to use. At present, magnetic tape programs for numerical machine tools may be verified by several different methods. Commonly, the program is used for a dry run. That is, the machine is caused to operate, without its cutting tool, through a complete set of motions, and these motions are watched by the operator to determine, as best he can, if they are correct. Alternatively, the duplicate tool-operating tape copy may be used to run a plotting machine, whereby a drawing of the part may be produced. Both of these methods may fail to permit precision verification of some or all of the program parameters and, further, require the time of expensive equipment.

Various systems and arrangements have been suggested in the past for verifying and reproducing magnetic tapes. Many tape verifying systems employ various forms of parity checking devices and circuits, such as shown, for example, in U. S. Pat. Nos. 2,961,643 to Ayres et al,. 3,430,197 to Brown and 2,929,049 to Lubkin. Some of the prior-art systems electronically check and correct the tape while writing. Typical of such systems are those shown in U. S. Pat. Nos. 3,344,417 to Boyle and 3,243,789 to Ragle, Jr.

To insure accurate copying, some have suggested, as shown in U. S. Pat. No. 2,950,464 to Hinton et al., that totally redundant systems be employed to avoid errors in the duplication of recorded information.

In the system shown in U. S. Pat. No. 2,774,056 to Stafford et al., the making of duplicate film or tape copies is monitored for accuracy by an electronic system that reads from the master record, and also from the copy, and electronically compares the two to verify identity therebetween.

None of the above-described prior-art systems can be employed feasibly, or economically, for solution of the problems connected with providing proper tool-operating program copies for numerically controlled machine tools.

Accordingly, it is an object of the present invention to provide a method and apparatus for identifying, verifying, correcting and reproducing suitable duplicate operating copies of numerically controlled machine tool programs.

SUMMARY OF THE INVENTION

In carrying out principles of the present invention in accordance with a preferred embodiment thereof, a desired digital control program is selected from a file of programs stored on a master magnetic tape. The selected program is read and temporarily stored. From the temporary storage, the program is duplicated upon a machine tool-operating tape and, concomitantly, visually displayed to enable an operator to identify, verify and correct the temporarily stored program. The duplicating process may be interrupted at any time and at any portion of the program to correct errors or to make desired changes which are incorporated in the duplicate operating tape copy.

DETAILED DESCRIPTION

Figure 1:
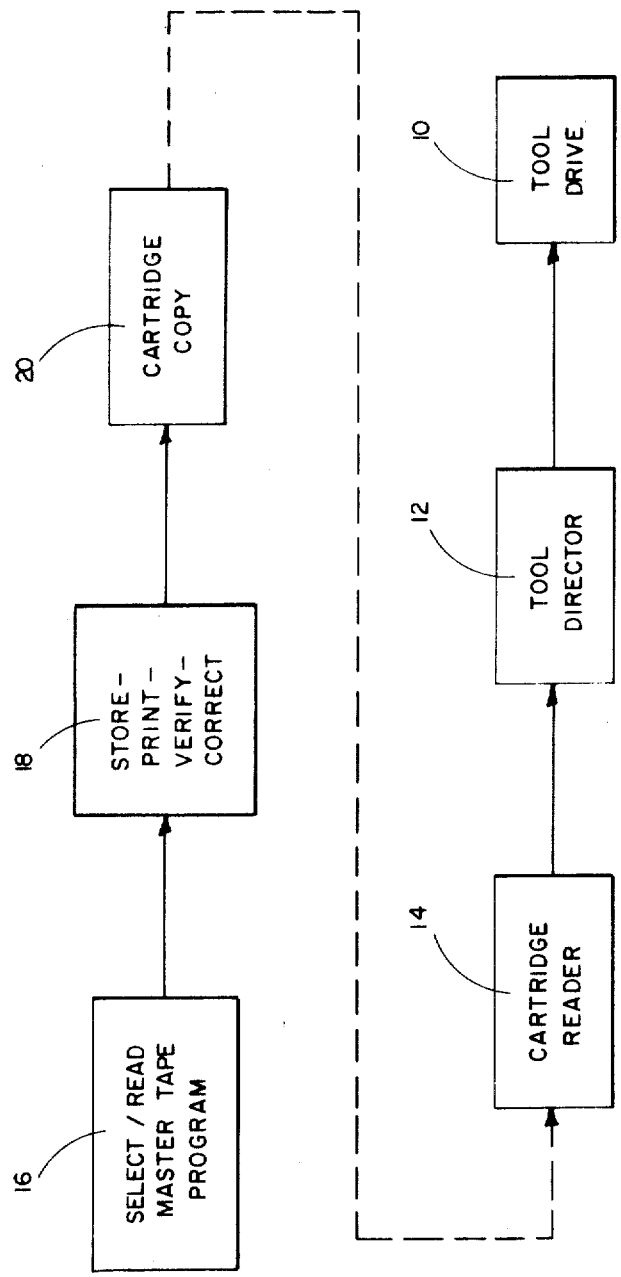
FIG. 1 illustrates the steps employed in operating a machine tool from a program contained in a master record in accordance with the present invention.

Referring to FIG. 1, a machine tool embodies a tool-drive system 10 that may comprise several separate and independent motors for accomplishing different motions of the tool itself, and various motions of the tool relative to the work table to which the workpiece is affixed. Neither the tool nor the work table are shown in FIG. 1. The several motors of the tool drive 10 are operated under control of electrical signals provided from a tool director 12 that embodies electronic circuitry for receiving, decoding and distributing data in digital form received from a tool-program reader.

In the system for which the present invention is most specifically adapted for use, the tool-program reader conveniently comprises a magnetic tape cartridge reader 14, including a magnetic tape cartridge transport and associated control electronics positioned at or closely adjacent the machine tool itself. Such a cartridge reader may be of any well-known type, such as that designated as Model C-1,400 Incremental Magnetic Recorder produced and sold by Kennedy Company, 540 West Woodbury, Altadena, Calif. When used for reading the tool-operating tape copy to provide signals to the tool director, the cartridge reader is preferably modified to eliminate or disable its write function so that the tool-operating tape copy will not be inadvertently erased or destroyed. Obviously, other types of magnetic tape readers, whether reel-type or cartridge-type, may be employed as deemed necessary or advisable, such as, for example, the Kennedy Company Model DSP-340 Incremental Cartridge Recorder.

The exemplary cartridge recorders employed to provide digital program signals to the tool director handle up to 300 feet of one-half inch 1.5 mil tape having seven channels of up to 720,000 characters in a gapless arrangement, and with a character density of 200 bits per inch. The use of a cartridge for shop operation has many advantages, including ease of tape loading and maximized tape protection. The cartridge tape concept is particularly attractive where semiskilled personnel must handle the tape. Thus, for operation of the machine tool in accordance with a given program, there is prepared a duplicate tool-operating magnetic tape cartridge having the program magnetically recorded thereon. This cartridge is physically loaded into the cartridge reader 14 at the machine tool station and the apparatus operated to manufacture the selected part.

A significant aspect of the present invention resides in the apparatus and method for preparing such tool-operating magnetic tape cartridge from a library of master program tapes. As illustrated in FIG. 1, the desired program is selected from a master tape, or a group of master tapes bearing the master file of programs, and the selected program is read from the master tape. This last function is indicated generally by block 16 of FIG. 1. The selected program is then temporarily stored in a small-scale interfacing computer from which it may be printed out, verified and then corrected, as indicated functionally by block 18 in FIG. 1. These functions and the subsequent function of making the duplicate tool-operating tape copy are performed at a station to which the master program tape may be readily and safely transported. Thus, the master tape, bearing the program to be selected and duplicated, is physically removed from library storage and then read by apparatus provided for the practice of the present invention. Information read from the master is temporarily stored.

From temporary storage, an alpha numeric printout is provided for visual inspection by the person making the duplicate copy. Then, by operation of a suitable keyboard machine, such as a punched tape-operated typewriter or teletype printer, errors in the master tape or in the temporarily stored program are corrected or changes made as required, so that the temporarily stored program is modified in accordance with such changes or corrections. The temporarily stored program as modified is then sent to a suitable cartridge tape mechanism to produce the duplicate tool-operating cartridge tape that bears the selected and corrected program, the latter function being indicated by block 20. This duplicate tape is then physically transported (hand-carried, for example) to the cartridge reader 14 at the machine tool station for use in the production of the part to be manufactured.

The described arrangement avoids the previous need for use of the expensive general-purpose computer time to copy the master tape or to make corrections or changes in the original program. The program selected from the group of programs on the master tape may be readily and positively identified by visual inspection of the alpha numeric printout, rather than by counting file marks on the master tape that mark the end of one program and the beginning of the next. Instructions contained in a given program may be readily changed by the operator. For example, a given program originally made for use with a particular machine may not ordinarily be applied to another machine without substantial correction. Factors and parameters of the program related to machine speed and feed rate may be readily identified in the alpha numeric printout of the original program. Such factors may then be changed by keyboard operation to modify the program in the temporary storage. The duplicate tool-operating magnetic tape cartridge will then be a copy of the program appropriately modified for the second machine.

Heretofore, where engineering design changes are made in a particular part, the program for that part has been changed by feeding this modified or changed information into the master general-purpose computer, which then produces the new master tape program embodying the engineering design changes. In the practice of the present invention, on the other hand, such engineering design changes may be inserted into the temporarily stored program by means of the manually operated keyboard, whereby the temporarily stored program will incorporate such engineering design changes and may be employed to produce tool-operating copies or new master tapes in much simplified fashion.

Figure 2:
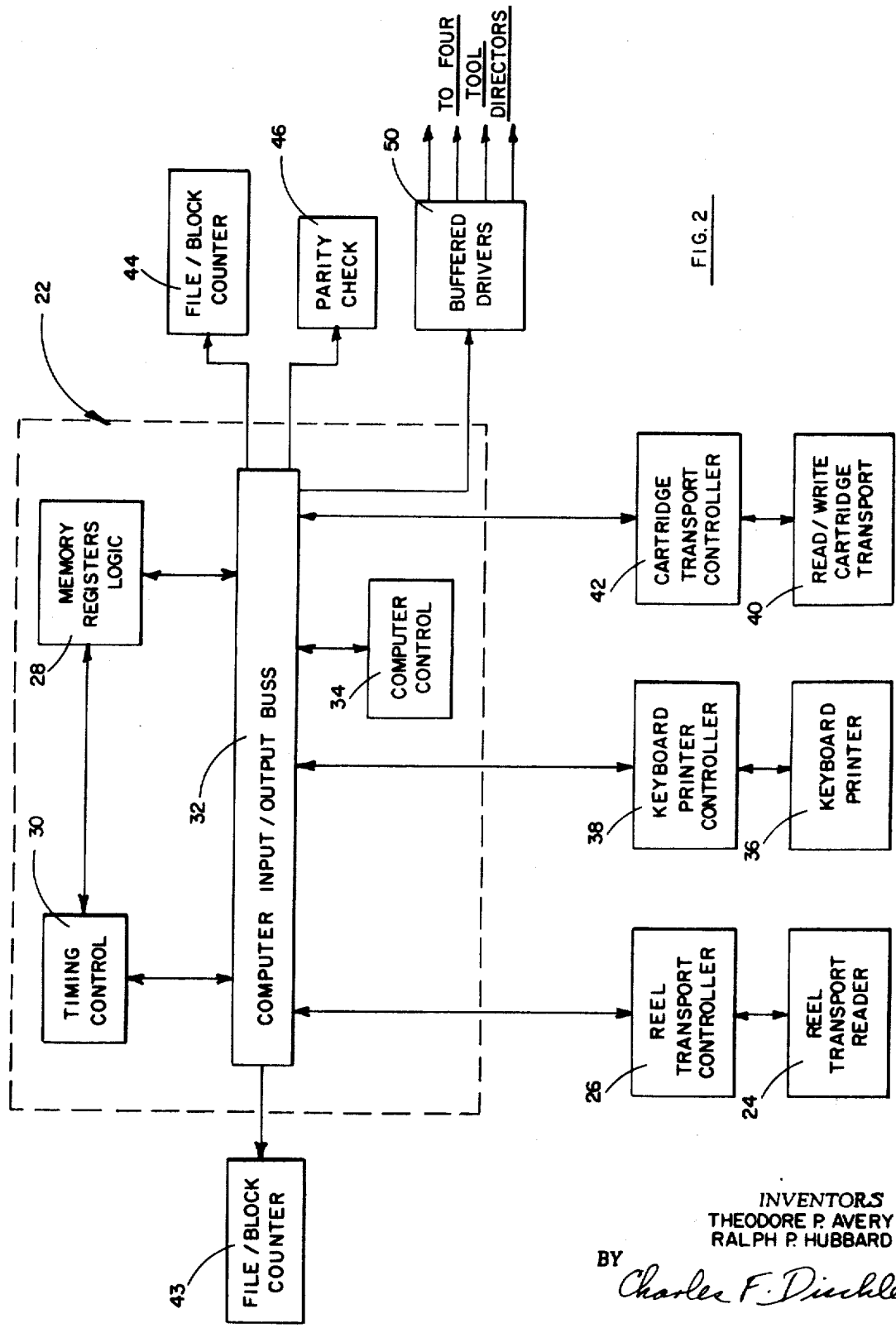
FIG. 2 is a block diagram of a system for carrying out the described method.

Illustrated in FIG. 2 is a block diagram of apparatus specifically arranged for practice of the present invention. The described apparatus comprises conventional and readily available equipment that is arranged as described herein and operated in accordance with the present invention in order to afford improved numerically controlled machine tool operation. Fundamentally, the apparatus illustrated in FIG. 2 comprises a small desk-type computer 22, shown within the phantom lines, receiving information from a reel transport reader 24 under control of a reel transport controller 26. For practice of the present invention, computer 22 requires conventional memory, storage registers and control logic, indicated at 28, suitable timing and control circuits, indicated at 30, a computer input-output bus 32 and a computer control console 34. Although many readily available and known apparatus for exercising the requisite control of peripheral equipment and providing the temporary storage required for the practice of the present invention are readily available and well known to those skilled in the art, there is preferred a system-oriented digital computer, such as the Varian Data 620/i computer made and sold by Varian Data Machines of Irvine, Calif. Although this particular machine is capable of performing many operations, including a variety of arithmetic computations not required in the practice of the present invention, its ready availability, size and cost make it most useful and practical for performing particular functions required of the present invention.

Also operatively connected with the input-output bus 32 is a standard keyboard-operated printer 36 under control of a keyboard-printer controller 38 and a read-write cartridge transport 40 under control of a cartridge-transport controller 42. The several controllers 26, 38 and 42 represent the electronic control circuitry that is normally built into and directly associated with the physical transport or printing mechanism. Each of the control circuits 26, 38 and 42 is suitably connected to the computer input-output bus 32 for transmission between the computer memory and the peripheral equipment 24, 36, 40 of data and suitable timing and control signals necessary to perform the functions described herein.

Also coupled with the computer input-output bus 32 are file/block counters 43, 44 and a parity check circuit 46.

It will be readily appreciated that many types of conventional equipment may be employed for the peripheral devices illustrated in FIG. 2. In an exemplary system for practice of the present invention, it is preferred to use for the input reel transport reader and controller 24, 26 a device such as the Model 1,510 Incremental Magnetic Recorder manufactured by the Kennedy Company. Such a device is capable of reading gapped computer tape or gapless file tape having information density of 556 bits per inch.

The printer and controller 36, 38 may be a conventional punched tape-operated typewriter, such as the Friden Flexowriter, or a standard teletype or line printer having a keyboard input.

The cartridge transport and controller 40, 42 preferably comprises one of the aforementioned Kennedy Incremental Cartridge Recorders, such as Model DSP 340 or Model 1,400.

In the practice of the present invention employing the equipment and arrangement as illustrated in FIG. 2, a master reel of magnetic tape having a desired program or plurality of programs recorded thereon is to have a predetermined program selected, verified for identity and accuracy of content, corrected or changed if necessary, and reproduced upon a cartridge-borne tape that will be employed as the actual tool-operating command signal generator for the numerically controlled machine tool director.

The master tape reel is loaded into the transport reader 24. Under control of computer and timing control 30, 34, the reader scans the tape rapidly and via the computer input-output bus provides a visual readout at a file/block counter 43 of both the file number and number of the block within each file as the reel is scanned. Normally, each program is considered to be a single file, and adjacent programs stored upon a master tape are separated by markers such as reflective strips applied to the tape. The counter 43 keeps track of the several master program files as the master tape is rapidly scanned so that a particular program, or file, may be chosen by its number.

Each program is recorded on the master tape as a group of discrete blocks of information. Where a gapped format is used, a gap is provided between successive blocks. In a gapless format, certain bits contained within each block identify the end of one block and the beginning of the next. Counter 43, accordingly, keeps track of the individual block being read and displays the particular block number.

When the selected file has been located, the computer is operated to cause the transport reader 24 to slow its operation and operate in a read mode. The selected program date is read into the computer and temporarily stored in its memory 28 block by block. Concomitantly with the reading into the computer memory, but somewhat delayed in order to accommodate the transfer of information between the computer input-output registers and the computer memory, the data received by the memory 28 is fed to the printer 36, 38 to provide an alpha numeric printout.

As the temporarily stored information is read from the computer memory to the printer, it is also read from the computer memory to the read-write cartridge transport 40, 42. Counter 44 identifies the file and block that are being transferred from memory for printout and recording on the cartridge transport 40, whereas file/block counter 43 identifies the file and block that are being transferred from the input reader 24 to the memory.

Where the computer memory 28 is of a size sufficient to retain and store the full program that is to be reproduced (and in some instances such a program may encompass more than one full master tape), the input transport may be continuously operated to read its information into the temporary computer storage. Of course, the printout for alpha numeric visual inspection is accomplished at a speed considerably slower than either the reading or writing speed that can be achieved with the transports 24 and 40. Accordingly, where computer 22 has a more limited capacity, or as an alternative mode of operation, the three different read and write operations (the single input read operation and the two output write operations) are preferably performed each on a step-by-step or block-by-block basis. In such block-by-block operation, a first block of data is read by the transport reader 24, which then stops at the end of such block. This block of information is transferred to the memory 28 for temporary storage. It is then transferred to both output devices, printer 36 and cartridge transport 40, although retained in the computer memory. When this block of information has been completely written into the cartridge transport 40, the latter transport stops and awaits a command signal to record the second block. The printer 36, the slowest of the three read and write devices 24, 26 and 40, continues its alpha numeric printout until the end of the first block has been reached. Thereupon, the printer, via its controller 38, feeds an "end of block" signal via the computer to start the transport reader 24 and initiate transfer of the second block of information into the computer memory. The second block is stored in a second address and thence read out into the cartridge transport 40 and the keyboard printer 36. This operation continues, on a block-by-block basis, with each of the transports 24 and 40 completing its operation and then awaiting completion of the printing of the particular block by the printer 36.

The alpha numeric printout provided by printer 36 allows ready visual identification of the program selected. Further, individual blocks of information, each generally denoting a particular machine tool instruction, may be visually analyzed, verified and then corrected if desired. If a particular block is determined to be in error after visual inspection, correction may be made by use of keyboard printer 36 to provide an input to the computer. Thus, the particular block number is identified by operation of the keyboard, and the new data to be contained in the block is also identified by operation of the keyboard. The corrected data from the keyboard printer is then fed by the computer input-output bus to the memory address that contains the identified block, thus correcting the data stored in such memory address. The same addressing command addresses the incremental cartridge transport 40 to the block of information to be corrected, and the corrected information is then fed from the memory for recording upon the cartridge-borne tape transport 40. In addition to correcting for errors, as visually determined by the operator, the described system and method provide a highly flexible and selective control of the content of individual blocks of information in any given program.

For example, where a master program originally created for a first machine tool having one speed of feed rate is to be modified for use on a second machine tool having a different speed or feed rate, the duplicate tool-operating tape that is made in the cartridge transport 40 may be readily provided with modified tool instructions. As printer 36 makes its alpha numeric printout, each speed or feed rate instruction is identified, or each block containing a speed or feed rate instruction is identified, and this is appropriately changed by means of the keyboard input into the computer memory from whence it is written into the duplicate cartridge tape. Thus, a given program is easily and inexpensively modified for a different machine tool without requiring an entirely new master program to be run upon the large computer.

Preferably, the system operates in a block-by-block mode where each block is read into the computer and then read out to the cartridge transport and to the keyboard printer, with each element and equipment stopping on completion of its own handling of the single block. In this mode of operation, the operator visually identifies each block as it is printed out and, upon verification of the accuracy of the block, may manually start the processing of the second block of data from the master reel transport reader.

For situations where immediate verification or correction of individual blocks is not required, the system may be controlled to operate on a continuous basis so that automatically, upon completion of each visual printout of a block, the next block is processed. Alternatively, all blocks of information may be read continuously from the reader at maximum reading speed and stored in the computer from which it is written into the cartridge tape at maximum writing speed. The alpha numeric printout will be completed at a slower printing speed and then the entire program may be visually inspected. Both the memory 28 and the cartridge tape transport 40 are addressable by block number from the manual keyboard 36. Thus, suitable correction may be made of the duplicate cartridge tape copy even after the full program has been duplicated in the cartridge. This continuous mode requires sufficient capacity in the memory 28 to retain an entire program. In the block-by-block mode, on the other hand, the memory capacity need only be adequate to simultaneously store but a few blocks of data, since the data is not needed in the temporary storage after visual verification and correction.

With the illustrated arrangement, many different modes of operation may be carried out. For example, 556 bits per inch gapped master file tape may be read and recorded as a 200 bits per inch gapless cartridge copy. The input tape can be readily scanned, either file-by-file or block-by-block, employing counter 43 to indicate and identify programs and particular blocks. Selected blocks may be read into the computer memory and checked by visual printout via printer 36 without making any copy. Provision may also be made for reading from cartridge transport 40 into the computer memory so that a previously made duplicate copy may be printed out block-by-block, or continuously, for alpha numeric visual verification. Broken or damaged shop cartridges and tapes may be reproduced by reading from the transport 40 into the memory from which the data to be corrected is printed out for visual inspection. The memory is corrected by the manual keyboard input and corrected data written from the memory into the original or a new cartridge tape. The identified computer is readily programmed to enable an operator to select any one of these modes of operation and to accomplish these under control of command signals provided by the computer.

Parity check 46 may be provided at both input and cartridge output lines of the computer for further verification of accuracy of the duplicated information.

For some situations where each tool of a group of machine tools is to be operated to manufacture the same part, the described apparatus may be readily adapted to furnish identical master program signals in parallel to a number of such identical machines. Accordingly, where such operation is desired, a plurality of buffered drivers, indicated at 50 in FIG. 2, may be provided to receive data from the computer memory. The latter, in turn, receives preproofed and verified data from the program carried on the tape reel being read by reader 24. Drivers 50 then will provide on each of a number of independent output lines the identical preproofed program signals to be fed directly to the several tool directors, such as tool director 12 of FIG. 1.

It will be seen that there has been provided a convenient and inexpensive method and apparatus for operating a numerical machine tool from master tape programs by use of duplicated cartridge tape copies made in such a manner as to enable ready identification, verification and correction of a selected program or portions thereof.

The foregoing detailed description is to be clearly understood as given by way of illustration and example only, the spirit and scope of this invention being limited solely by the appended claims.

What is claimed is:

1. In a method of operating a numerically controlled machine tool the steps of:
    providing a master tape file having one or more programs for control of the machine,
        each said program comprising a plurality of discrete blocks of data defining discrete machine instructions,
    selecting a desired program from said master tape file,
    reading the selected program from said master tape file,
    temporarily storing the program so read in a memory device,
    printing out the stored program from said memory device for visual inspection, identification and analysis,
    identifying, and changing or correcting individual blocks of the program that are temporarily stored, in accordance with visual inspection of said printed-out program,
        said last-mentioned step comprising manually operating a keyboard providing an input to said memory device to address and correct data in selected portions of said memory device,
    recording the changed or corrected temporarily stored program from said memory device upon a duplicate machine tool operating tape copy,
    loading said machine tool-operating tape copy into a machine-tool control reader, and
    operating said machine-tool control reader to generate machine-tool director signals.

2. The method of operating a numerically controlled machine tool having a director that generates control signals for the tool in accordance with digital program signals supplied thereto comprising the steps of
    selecting a desired digital control program from a file of programs stored on a master magnetic tape,
    reading the selected program from said master tape and temporarily storing the program so read in a storage device,
    recording said program from said storage device upon a second magnetic tape,
    providing a visual display of at least selected portions of the program stored in said storage device and read therefrom into said second tape, to facilitate identification of the program selected from the master tape, and reading the program recorded on said second tape to generate digital program signals for the director of said machine, whereby said machine is operated under control of the selected program and the machine operator may be assured of the proper identity of the selected program without employing the program to actuate the machine through a dry run without a tool inserted therein.

3. The method of claim 2 including the steps of
    correcting the selected program by inserting corrected data into the program stored in said storage device, and
    reading said corrected data from said storage device into said second tape at the point in the program recorded thereon that is desired to be corrected.

4. The method of claim 3 wherein said step of providing a visual display comprises the making of an alpha numeric printout of said selected program.

5. The method of claim 4 wherein said step of correcting the selected program comprises manually operating a keyboard printer to generate and address correction data to said storage device.

6. A system for verifying and duplicating a machine tool program stored on a magnetic tape comprising
    a master tape transporter and reader for reading machine tool program information stored on a master tape,
    a temporary storage device connected to the transporter reader for receiving and storing information read from the master tape, a tool-operating mangetic tape copy read-write unit connected to said storage device to record information therefrom,
    said storage device having a second input adapted to receive and store information received from said tape copy read-write unit,
    a verification output device having an input from said temporary storage device for providing a visual display suitable for visual verification of information contained in such storage device, and a correction input device for providing a manual data input to said temporary storage device, whereby information may be read from said master tape or from said tool-operating magnetic tape copy for storage in said storage device and printed from said storage device for visual verification, and whereby information in said storage device may be corrected on the basis of said visually verified printout and then read into said read-write tape copy unit to provide a verified and corrected magnetic tape copy of information stored on said master tape or on said tool-operating magnetic tape copy.

7. The method of reproducing and verifying a magnetic tape machine tool program stored on a master tape that embodies a number of such programs comprising the steps of searching said master tape for a selected program, reading and storing the selected program, printing out the stored program from said storage device, analyzing and verifying the program printed out, and writing the stored program from said storage device onto a record copy device to thereby provide a verified duplicate tool-operating tape copy.

8. The method of claim 7 including the steps of modifying the program stored in said storage device and writing the modified program onto said record copy device.

9. In a method of operating a numerically controlled machine tool the steps of:

providing a master tape file having one or more programs for control of the machine, each said program comprising a plurality of discrete blocks of data defining discrete machine instructions, selecting a desired program from said master tape file, reading the selected program from said master tape file, temporarily storing the program so read in a memory device, printing out the stored program from said memory device for visual inspection, identification and analysis, identifying and changing or correcting individual blocks of the program that are temporarily stored, in accordance with visual inspection of said printed-out program, said last-mentioned step comprising manually operating a keyboard providing an input to said memory device to address and correct data in selected portions of said memory device, and feeding to a machine tool control reader discrete machine instructions defined by blocks of data in said changed or corrected temporarily stored program of said memory device.

10. The method of claim 9 including the step of buffering the discrete machine instructions read from said memory device before such instructions are fed to said machine tool control reader.

11. The method of claim 9 including the steps of recording the changed or corrected temporarily stored program from said memory device upon a duplicate machine tool operating copy, and feeding data defining discrete machine instructions from said machine tool operating copy to said machine tool control reader.

12. A system for verifying and duplicating a body of data stored on a magnetic tape comprising a master tape transporter and reader for reading information stored on a master tape, a temporary storage device connected to the transporter reader for receiving and storing information read from the master tape, a buffered driver connected to receive information read from said temporary storage device, a verification output device having an input from said temporary storage device for providing a visual display suitable for visual verification of information contained in such storage device, and a correction input device for providing a manual data input to said temporary storage device, whereby information may be read from said master tape for storage in said storage device and printed from said storage device for visual verification, and whereby information in said storage device may be corrected on the basis of said visually verified printout and then read through said buffered driver to a machine tool operating director.

\* \* \* \* \*